United States Patent
Meier et al.

(10) Patent No.: US 12,056,942 B2
(45) Date of Patent: Aug. 6, 2024

(54) METHOD AND SYSTEM FOR PROCESSING AN IMAGE BY DETERMINING ROTATION HYPOTHESES

(71) Applicants: TOYOTA MOTOR EUROPE, Brussels (BE); TECHNICAL UNIVERSITY OF MUNICH, Garching bei Munich (DE)

(72) Inventors: Sven Meier, Brussels (BE); Norimasa Kobori, Brussels (BE); Fabian Manhardt, Garching bei Munich (DE); Diego Martin Arroyo, Garching bei Munich (DE); Federico Tombari, Garching bei Munich (DE); Christian Rupprecht, Garching bei Munich (DE)

(73) Assignees: TOYOTA MOTOR EUROPE, Brussels (BE); TECHNICAL UNIVERSITY OF MUNICH, Munich (DE)

( * ) Notice: Subject to any disclaimer, the term of this patent is extended or adjusted under 35 U.S.C. 154(b) by 616 days.

(21) Appl. No.: 17/274,357

(22) PCT Filed: Sep. 7, 2018

(86) PCT No.: PCT/EP2018/074215
§ 371 (c)(1),
(2) Date: Mar. 8, 2021

(87) PCT Pub. No.: WO2020/048620
PCT Pub. Date: Mar. 12, 2020

(65) Prior Publication Data
US 2022/0050997 A1    Feb. 17, 2022

(51) Int. Cl.
*G06K 9/00*   (2022.01)
*G06N 3/08*   (2023.01)
(Continued)

(52) U.S. Cl.
CPC .......... *G06V 20/64* (2022.01); *G06N 3/08* (2013.01); *G06T 7/50* (2017.01); *G06V 10/44* (2022.01);
(Continued)

(58) Field of Classification Search
CPC ........ G06V 20/64; G06V 10/44; G06V 10/82; G06N 3/08; G06T 7/50; G06T 2207/20081; G06T 2207/20084; G06T 7/70
See application file for complete search history.

(56) References Cited

U.S. PATENT DOCUMENTS 5,845,048 A    12/1998  Masumoto
7,680,300 B2 *  3/2010  Chang ................. G06V 20/647
                                                     348/169

(Continued)

FOREIGN PATENT DOCUMENTS

JP    H8-212329 A    8/1996
WO   2018065073 A1  4/2018

OTHER PUBLICATIONS

Xiang et al.("ObjectNet3D: A Large Scale Database for 3D Object Recognition" ECCV 2016: Computer Vision—ECCV 2016 pp. 160-176, Stanford University, 2016) (Year: 2016).*

(Continued)

*Primary Examiner* — Shervin K Nakhjavan
(74) *Attorney, Agent, or Firm* — Oliff PLC

(57) ABSTRACT

A system and a method for processing an image include inputting the image to a neural network configured to: obtain a plurality of feature maps, each feature map having a respective resolution and a respective depth, perform a classification on each feature map to deliver, for each feature map: the type of at least one object visible on the image, the position and shape in the image of at least one two- (Continued)

dimensional bounding box surrounding the at least one object, a plurality of rotation hypotheses for the at least one object.

12 Claims, 2 Drawing Sheets

(51) Int. Cl.
    *G06T 7/50*         (2017.01)
    *G06V 10/44*      (2022.01)
    *G06V 20/64*      (2022.01)

(52) U.S. Cl.
    CPC ............... *G06T 2207/20081* (2013.01); *G06T 2207/20084* (2013.01)

(56) References Cited

U.S. PATENT DOCUMENTS

| | | | |
|---|---|---|---|
| 10,223,610 B1* | 3/2019 | Akselrod-Ballin | G06T 7/174 |
| 10,380,413 B2* | 8/2019 | Ye | G06V 10/7557 |
| 10,445,402 B1* | 10/2019 | Wang | G06V 10/764 |
| 10,769,411 B2* | 9/2020 | Grabner | G06T 19/20 |
| 11,030,442 B1* | 6/2021 | Bergamo | G06F 18/214 |
| 11,087,130 B2* | 8/2021 | Liu | G06F 18/21 |
| 11,132,809 B2* | 9/2021 | Lee | G06T 7/593 |
| 11,335,024 B2* | 5/2022 | Meier | G06F 18/24 |
| 11,410,307 B2* | 8/2022 | Rijken | A61B 6/5235 |
| 2008/0298672 A1 | 12/2008 | Wallack et al. | |
| 2016/0174902 A1* | 6/2016 | Georgescu | G06V 10/454 600/408 |
| 2018/0121762 A1* | 5/2018 | Han | G06V 30/194 |
| 2018/0211401 A1* | 7/2018 | Lee | G06T 7/593 |
| 2018/0276841 A1* | 9/2018 | Krishnaswamy | G06V 10/25 |
| 2019/0130580 A1* | 5/2019 | Chen | G06V 10/82 |
| 2019/0147221 A1* | 5/2019 | Grabner | G06T 7/75 382/103 |
| 2019/0279046 A1* | 9/2019 | Han | G06T 3/40 |
| 2019/0304134 A1* | 10/2019 | Mauchly | G06T 15/20 |
| 2020/0175352 A1* | 6/2020 | Cha | G06N 3/04 |

OTHER PUBLICATIONS

Wadim Kehl et al.; "SSD-6D: Making RGB-Based 3D Detection and 6D Pose Estimation Great Again"; 2017; IEEE International Conference on Computer Vision; pp. 1530-1538.

Poirson et al.; "Fast Single Shot Detection and Pose Estimation;" 2016 Fourth International Conference on 3D Vision; 2016; pp. 676-684.

Szegedy et al.; "Inception-v4, Inception-ResNet and the Impact of Residual Connections on Learning;" 2016; Arvix.org, Cornell University Library; 201 Olin Library Cornell University, Ithaca, New York, 14853.

May 20, 2019 Search Report issued in International Patent Application No. PCT/EP2018/074215.

* cited by examiner

METHOD AND SYSTEM FOR PROCESSING AN IMAGE BY DETERMINING ROTATION HYPOTHESES

FIELD OF THE DISCLOSURE

The present disclosure is related to the field of image processing, and more precisely to the detection of three-dimensional objects on an image.

DESCRIPTION OF THE RELATED ART

It has been proposed to detect three-dimensional objects on images acquired by cameras.

Typically, it is also desirable to obtain the 6D pose of the objects visible on an image. "6D pose" is an expression well known to the person skilled in the art which designates the combination of the three-dimensional position and of the three-dimensional orientation of an object.

Obtaining the 6D pose is particularly useful in the field of robotics wherein objects are detected and manipulated.

One difficulty in detecting the 6D pose or even the orientation of objects is the difficulty to deal with symmetrical objects or occlusions. For example, the pose of a cup having a handle is very difficult to determine when the handle is occluded, but it is well detectable when the handle is visible.

It has been proposed to use neural networks to detect the pose of objects. These neural network may be configured to output a detected pose for a given input image. To obtain this result, a training step is performed on the neural network in which known images are inputted to the neural network and it is determined whether the output of the neural network is close to the expected output. This determination usually involves the use of a loss function, and the result of this loss function is often used to update the neural network so that in the next iteration of the training, an improved loss is obtained.

Known methods are not capable of dealing with these ambiguities and this is not satisfactory.

SUMMARY OF THE DISCLOSURE

The present disclosure overcomes one or more deficiencies of the prior art by proposing a method for processing an image comprising inputting the image to a neural network configured to:
obtain a plurality of feature maps, each feature map having a respective resolution and a respective depth,
perform a classification on each feature map to deliver, for each feature map:
  the type of at least one object visible on the image,
  the position and shape in the image of at least one two-dimensional bounding box surrounding the at least one object,
  a plurality of rotation hypotheses for the at least one object.

The inventors of the present application have observed that known methods which only predict a single rotation hypothesis or pose are incapable of dealing with objects having symmetries. By obtaining a plurality of rotation hypotheses, the symmetries of objects can be better learned during a training phase, and the ambiguities are diminished.

By way of example, the image can be a color image such as an RGB (Red-Green-Blue) image known to the skilled person.

A feature map is a matrix of vectors typically outputted by a neural network or a portion of a neural network, the expression resolution is directed at the resolution of the matrix and the depth relates to the depth of the vectors of the matrix.

The expression "neural network" used in the present application can cover a combination of a plurality of known networks. For example, the step of obtaining a plurality of feature maps may be performed using a first sub-network. The skilled person will know which sub-network to use to obtain the feature maps having a respective resolution and a respective depth.

Also, the skilled person will be able to use a sub-neural network to perform the classification, using a number of outputs which will lead to obtaining the plurality of hypotheses.

The skilled person will know which sub-network to use to deliver, for each feature map:
  the type of at least one object visible on the image,
  the position and shape in the image of at least one two-dimensional bounding box surrounding the at least one object,
  a plurality of rotation hypotheses for the at least one object.

It should be noted that the skilled person knows that a bounding box is a virtual rectangle having coordinates that enclose the object. Each object is associated with at least one bounding box if multiple objects are determined. The bounding boxes can be selected among a plurality of predetermined bounding boxes; the classification step being configured to determine the best bounding boxes (i.e. the bounding boxes which are the closest to the object).

The type of an object is chosen among a predetermined set of objects which can be detected.

The rotation may be a three-dimensional rotation of the object expressed from a predefined reference position.

If several objects are visible on the image, then the neural network may output at least two groups of information as defined above.

Also, the neural network may output two or more groups of information for a same object, for example with a difference between the two groups relating to the bounding box.

It should be noted that using said neural network allows using massively parallel single pass networks, yielding vast increases in computational speed (the above method has been observed to work around 10 Hz, i.e. 10 images per second), and allows obtaining good accuracy.

According to a particular embodiment, the method further comprises performing a classification of the plurality of rotation hypotheses to obtain an estimated rotation.

According to a particular embodiment, the classification of the plurality of rotation hypotheses comprises a rejection of outliers or a clustering.

For example, the clustering may be performed using the mean-shift algorithm.

The classification of the plurality of rotation hypotheses may lead to a filtering of the rotations, or even to the determination of a median rotation value.

According to a particular embodiment, the distance between the object and an image acquisition module having acquired the image is determined using the diagonal length of the at least one bounding boxes.

According to a particular embodiment, the method comprises using the estimated rotation and said distance to estimate the 6D pose of the at least one object.

It has been observed that it is possible to obtain the 6D-pose of at least one object from this distance and the rotation.

According to a particular embodiment, the rotations are each expressed as a quaternion.

The inventors have observed that quaternion may be used to model spatial rotations, or three-dimensional rotations. A quaternion is defined by four values, and the classification may output a plurality of quaternion, one for each hypothesis.

According to a particular embodiment, the method further comprises performing a principal component analysis of on the rotation hypotheses so as to determine whether the rotation exhibits an ambiguity.

For example, thresholds may be used to determine whether the dominant singular value is above a threshold indicating an ambiguity.

According to a particular embodiment, the method comprises a preliminary training of the neural network, the preliminary training comprising inputting a template image in which at least one three-dimensional template object has been rendered to the neural network.

Rendering a three-dimensional template object means elaborating an image in which a projection of this template object is visible with a selected angle (hence the rotation is known).

Preferably, the method will be used on images which comprise an object which has been used as template object.

According to a particular embodiment, said preliminary training further comprises:
obtaining, using said neural network:
  the type of at least one object visible on the template image,
  the position and shape in the image of at least one two-dimensional bounding box surrounding the at least one object,
  a plurality of rotation hypotheses for the at least one object.
and minimizing L in the following equation:

$$L(Pos, Neg) = \sum_{b \in Neg} L_{class} + \sum_{b \in Pos} (L_{class} + \alpha L_{fit} + \beta M(f_\theta(I), p))$$

in which:

$$M(f_\theta(I), p) = \left(1 - \epsilon \frac{M}{M-1}\right) \hat{M}(f_\theta(I), p) + \frac{\epsilon}{M-1} \sum_{j=1}^{M} L(f_\theta^{(j)}(I), p)$$

$$\hat{M}(f_\theta(I), p) = \min_{j=1,\ldots,M} L(f_\theta^{(j)}(I), p)$$

and:
  I is the template image,
  Pos represents the bounding boxes which have an area which encloses a predefined fraction of area of template object,
  Neg represents the bounding boxes which have an area which does not enclose a predefined fraction of area of template object,
  b is a bounding box belonging to either Pos or Neg,
  $L_{class}$, is the loss associated with errors in the attribution of class,
  $L_{fit}$ is the loss associated with errors the location of the corners of bounding boxes,
  $L_{view}$ is the loss associated with errors in the attribution of viewpoints,
  $L_{inplane}$ is the loss associated with errors in the attribution of in-plane rotations,
  α, β and ϵ are predetermined coefficients,
  M is the number of rotation hypotheses,
  I is the template image
  p is the true rotation of the at least one object,
  $f_\theta^{(j)}(I)$ is the function which delivers the rotation hypothesis j,
  $f_\theta(I)$ is the function which delivers the rotation hypotheses $f_\theta^{(j)}(I)$,
  $L(f_\theta^{(j)}(I),p)$ is a loss function of $f_\theta(I)$ for a known rotation p.

In the above equations, the intermediary values $M(f_\theta(I), p)$ and $\hat{M}(f_\theta(I),p)$ represent a meta-loss values. More precisely, $\hat{M}(f_\theta(I),p)$ is the minimal loss for image I and pose p.

According to a particular embodiment, during the training, the neural network is updated using a rotation hypothesis θ* determined as:

$$\theta^* = \arg\min_\theta \sum_{i=1}^{N} M(f_\theta(I_i), p_i)$$

wherein $p_i$ are N rotations associated with images $I_i$ which have a similar image for the at least one object.

This facilitates the updating of the neural network by only using as a basis for the update the best output of the previous training step (training is iterative).

The present invention also provides a system for processing an image, the system comprising a neural network to which the image can be inputted, the neural network being configured to:
obtain a plurality of feature maps, each feature map having a respective resolution and a respective depth,
perform a classification on each feature map to deliver, for each feature map:
  the type of at least one object visible on the image,
  the position and shape in the image of at least one two-dimensional bounding box surrounding the at least one object,
  a plurality of rotation hypotheses for the at least one object.

This system can be configured to carry out all the embodiments of the method for processing an image described above.

In one particular embodiment, the steps of the method for processing an image are determined by computer program instructions.

Consequently, the invention is also directed to a computer program for executing the steps of a method as described above when this program is executed by a computer.

This program can use any programming language and take the form of source code, object code or a code intermediate between source code and object code, such as a partially compiled form, or any other desirable form.

The invention is also directed to a computer-readable information medium containing instructions of a computer program as described above.

The information medium can be any entity or device capable of storing the program. For example, the medium can include storage means such as a ROM, for example a CD ROM or a microelectronic circuit ROM, or magnetic storage means, for example a diskette (floppy disk) or a hard disk.

Alternatively, the information medium can be an integrated circuit in which the program is incorporated, the circuit being adapted to execute the method in question or to be used in its execution.

BRIEF DESCRIPTION OF THE DRAWINGS

How the present disclosure may be put into effect will now be described by way of example with reference to the appended drawings, in which.

DESCRIPTION OF THE EMBODIMENTS

An exemplary method and system for processing an image will be described hereinafter.

Figure 1:
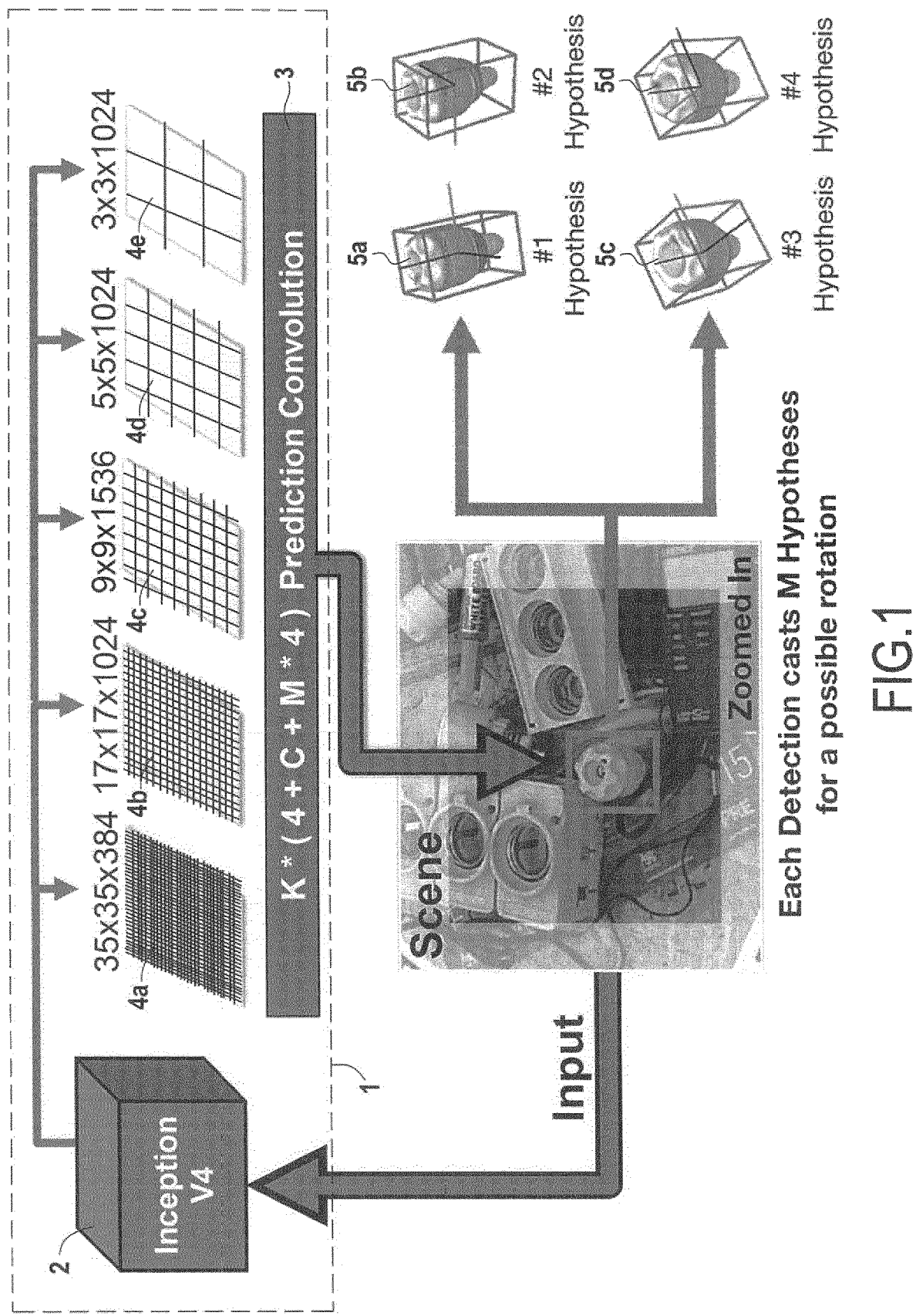
FIG. 1 is a block diagram of an exemplary method for processing an image according to an example.
Figure 3:
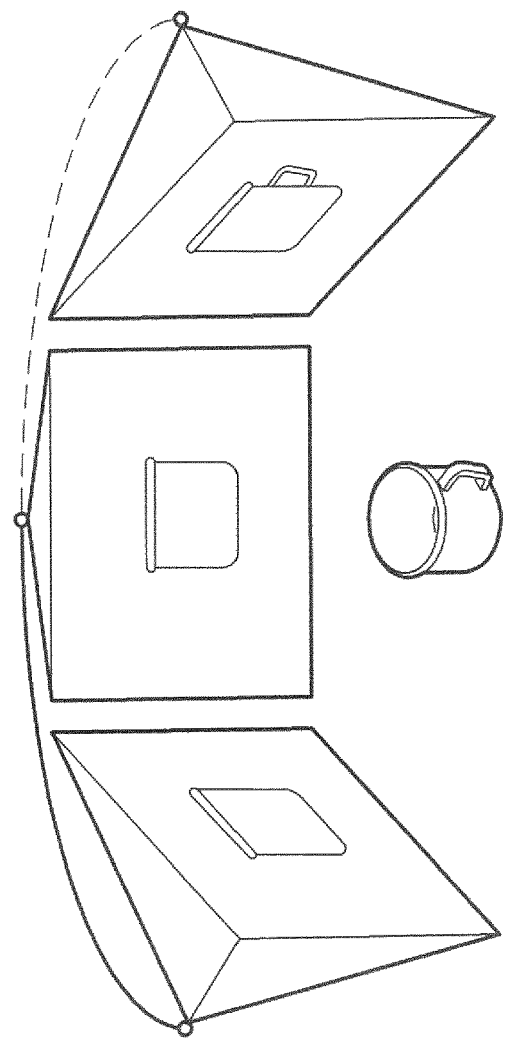
FIG. 3 shows the difficulty of processing objects having symmetries.

A method for processing an image is represented on FIG. 1. As will be explained hereinafter, this method is also able to determine the 6D pose of objects visible on the image. The invention is however not limited to the determination of the 6D pose of an object visible on an image.

The image to be processed is referenced IMG on FIG. 1. In this example, the image has a resolution of 299 pixels of width and 299 pixels of height. The image IMG is an RGB image, each pixel of the image is therefore associated with three values.

In order to process the image IMG, this image is inputted to a neural network 1 shown on FIG. 1. If the image IMG further comprises depth information (for example if it is an RGB-D image), only the RGB values may be inputted to the neural network 1, the depth information may however be used in a subsequent refining step.

The neural network 1 is configured to obtain a plurality of feature maps, each feature map having a respective resolution and a respective depth. To this end, the neural network 1 comprises a sub-network 2 which is able to elaborate five feature maps. The five features maps each have different resolutions.

For example, a first feature map 4a has a resolution of 35 times 35 and a depth of 384. A second feature map 4b has a resolution of 17 times 17 and a depth of 1024. A third feature map 4c has a resolution of 9 times 9 and a depth of 1536. A fourth feature map 4d has a resolution of 5 times 5 and a depth of 1024. A fifth feature map 4e has a resolution of 3 times 3 and a depth of 1024.

The person skilled in the art will be able to choose how many feature maps should be used as well as their resolutions and depths. For example, a calibration step can be carried out to determine the number of feature maps, their resolutions, and their depths, as a function of the application. The use of different resolutions allows detecting objects having various scales.

Preferably, the sub-network 2 is the network known by the person skilled in the art as InceptionV4 and described in "Inception-ResNet and the Impact of Residual Connections", C. Szegedy, S. Ioffe, and V. Vanhoucke.

Preferably, the sub-network 2 is trained in a prior step.

The neural network 1 is further configured to perform a classification on each feature map to deliver, for each feature map:

the type of at least one object visible on the image,
the position and shape in the image of at least one two-dimensional bounding box surrounding the at least one object,
a plurality of rotation hypotheses for the at least one object.

To this end, the neural network 1 comprises a sub-network 3. Preferably, the sub-network 3 is regression neural network.

The sub-network 3 receives the five feature maps 4a to 4e as input and has, in this example, the appropriate number of neurons to deliver the above outputs.

Especially, the sub-network 3 may output a number of hypotheses for the pose, which leads to a number of neurons chosen to deliver these hypotheses.

If the rotation hypotheses are expressed using quaternion then four neurons may be used for each rotation hypothesis.

The output of the sub-network 3 which has received a feature map may have the resolution of the feature map and a depth of:

$$K \times (4+C+M \times 4)$$

Wherein K is the number of candidate bounding boxes, C is the number of possible object types, and M the number of hypotheses.

On the figure, four rotation hypotheses 5a, 5b, 5c, and 5d have been represented for an object present on the image IMG.

The training of the neural network will now be described.

Preliminarily, it should be noted that it has been observed that it is possible to model spatial rotations (in the present application, the expression rotation is directed at three-dimensional rotations or spatial rotations) using quaternions.

A quaternion is given by:

$$q = q_1 1 + q_2 i + q_3 j + q_4 k = (q_1, q_2, q_3, q_4)$$

With:

$$(q_1, q_2, q_3, q_4) \in \mathbb{R}$$

$$i^2 + j^2 + k^2 = ijk = -1$$

It is possible to omit the southern hemisphere and to only use the rotations above the $q_1=0$ hyperplane, which allows expressing any possible three dimensional rotation using a single quaternion.

Also, during training, if N images $i_t$ of a known dataset are each associated with a predefined rotation $p_i$ (with $i \in \{1, \ldots, N\}$ of an object which presents symmetries, with an identical image of the object, the set of rotations is:

$$S(I_i) = \{p_j | I_j = I_i\}$$

This formulation is adapted for discrete symmetries. For non-discrete symmetries, the skilled person will adapt the sums of S to an integral.

In the present neural network, multiple rotation hypotheses are obtained. The function of the neural network is written as:

$$f_\theta(I) = (f_\theta^{(1)}(I), \ldots, f_\theta^{(M)}(I))$$

Therefore, there are M hypotheses for a given object and bounding box.

Preferentially, in order to better update the neural network at each step of the training, only the loss which is the closest to the expected result (the known rotation) will be used to update the parameters of the neural network. Updating the parameters of the neural network is often called updating the weights of the neural network, and this updating is based on a calculated loss.

The determination of the loss to be used is given by:

$$\theta^* = \arg\min_\theta \sum_{i=1}^{N} M(f_\theta(I_i), p_i)$$

During training, template images (known images) comprising rendered objects (for example rendered three-dimensional objects having a known rotation) are inputted to the neural network, and the output is, after the classification step:
- the type of at least one object visible on the template image,
- the position and shape in the image of at least one two-dimensional bounding box surrounding the at least one object,
- a plurality of rotation hypotheses for the at least one object.

The loss may therefore be calculated by minimizing L in the following equation:

$$L(Pos, Neg) = \sum_{b \in Neg} L_{class} + \sum_{b \in Pos} (L_{class} + \alpha L_{fit} + \beta M(f_\theta(I), p))$$

In which:

$$M(f_\theta(I), p) = \left(1 - \epsilon \frac{M}{M-1}\right) \hat{M}(f_\theta(I), p) + \frac{\epsilon}{M-1} \sum_{j=1}^{M} L(f_\theta^{(j)}(I), p)$$

$$\hat{M}(f_\theta(I), p) = \min_{j=1,\ldots,M} L(f_\theta^{(j)}(I), p)$$

and:
- I is the template image,
- Pos represents the bounding boxes which have an area which encloses a predefined fraction of area of template object,
- Neg represents the bounding boxes which have an area which does not enclose a predefined fraction of area of template object,
- b is a bounding box belonging to either Pos or Neg,
- $L_{class}$ is the loss associated with errors in the attribution of class,
- $L_{fit}$ is the loss associated with errors the location of the corners of bounding boxes,
- $L_{view}$ is the loss associated with errors in the attribution of viewpoints,
- $L_{inplane}$ is the loss associated with errors in the attribution of in-plane rotations,
- $\alpha$, $\beta$ and $\epsilon$ are predetermined coefficients,
- M is the number of rotation hypotheses,
- I is the template image
- p is the true rotation of the at least one object,
- $f_\theta^{(j)}(I)$ is the function which delivers the rotation hypothesis j,
- $f_\theta(I)$ is the function which delivers the rotation hypotheses $f_\theta^{(j)}(i)$,
- $L(f_\theta^{(j)}(I), p)$ is a loss function of $f_\theta(I)$ for a known rotation p.

It should be noted that the predetermined coefficient may be determined by the person skilled in the art.

The weight $\epsilon$ is used to weight the average error for all the hypotheses.

Also, the normalization constants $$\left(1 - \epsilon \frac{M}{M-1}\right) \text{ and } \frac{\epsilon}{M-1}$$

are designed to give a weight of (1−$\epsilon$) to the loss $\hat{M}$ and an $\epsilon$ gradient descent distributed over all other hypotheses.

When $\epsilon \to 0$, then $M \to \hat{M}$.

It should be noted that when an image is inputted to the neural network, a further classification may be performed to obtain, for a detected object, an estimated rotation.

For example, the classification may comprise a rejection of outliers using any suitable method known to the skilled person, or even a clustering method.

For example, the mean-shift algorithm may be used to cluster the hypotheses in the quaternion space while the angular distance of the quaternion vectors is used to measure their similarity. This yields either one cluster in ambiguous but connected rotations or multiple I unconnected rotations. Also, for each cluster, a median rotation may be computed.

It should be noted that it is possible to estimate the distance between a detected object and an image acquisition module having acquired the image using the diagonal length of the at least one bounding boxes.

Then, it is possible to estimate the 6D pose of this object using the rotation and said distance. This may use a reference 6D pose of the object at a predefined distance (for example 0.5 meter), and the 6D pose may be inferred.

Additionally, in order to compare the similarity between two quaternions, it is possible to use a trigonometric-free measure for the distance of the angle $\phi = \arccos(2\langle q, q'\rangle^2 - 1)$ with q and q' being two quaternions.

The distance is:

$$L(q,q') = 1 - \langle q,q'\rangle^2 \in [0,1]$$

It is also possible to study the distribution of the hypotheses in the quaternion space to determine whether there is an ambiguity. Principal component analysis (PCA) may be performed to this end on the quaternion hypotheses. A singular-value decomposition of the data matrix (the hypotheses) provides information on the ambiguity.

For example, if the variance $\sigma_1 \gg 0$ (a threshold may be defined) for the dominant singular value ($\sigma_i > \sigma_{i+1} \forall i$) then there is an ambiguity in the prediction of the rotation resulting from the object symmetry. Small singular values imply a convergence towards a single solution.

Figure 2:
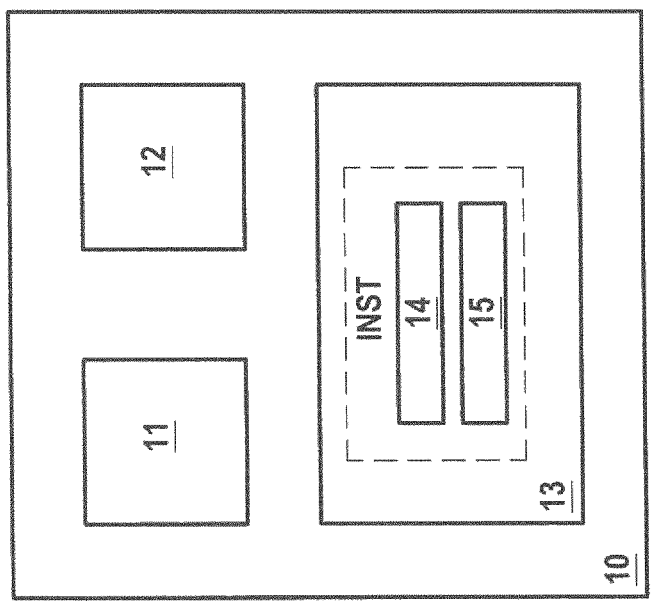
FIG. 2 is a block diagram of an exemplary system for processing an image according to an example.

The steps of the methods described in reference to FIG. 1 can be determined by computer instructions. These instructions can be executed on a processor of a system, as represented on FIG. 2.

On this figure, a system 10 has been represented. This system comprises a processor 11, an acquisition module 12 configured to acquire images, and a memory 13.

The memory 13 can be a non-volatile memory and it comprises a set of instructions (or computer program) INST which can be executed by the processor 11 to perform the method described in reference to FIG. 1. The set of instructions INST comprises:
- an instruction 14 to obtain a plurality of feature maps, each feature map having a respective resolution and a respective depth,
- an instruction 15 perform a classification on each feature map to deliver, for each feature map:
  - the type of at least one object visible on the image,
  - the position and shape in the image of at least one two-dimensional bounding box surrounding the at least one object, a plurality of rotation hypotheses for the at least one object.

The instructions INST may form the neural network described in reference to FIG. 1.

FIG. 4 shows a cup having an handle. Different projections of the cup are shown. When the handle is occluded, any image taken from the continuous line will deliver the same image of the cup.

Any image taken from the dotted line will deliver a different image of the cup for which there is no ambiguity in the determination of the rotation or of the 6D pose. The present invention allows determining when there is such an ambiguity.

The invention claimed is:

1. A method for processing an image using a processor, the method comprising:
   inputting, by a processor, an image to a neural network;
   obtaining, by the processor, a plurality of feature maps, each feature map having a respective resolution and a respective depth;
   performing, by the processor, a classification on each feature map to deliver, wherein for each feature map:
   the type of at least one object visible on the image,
   the position and shape in the image of at least one two-dimensional bounding box surrounding the at least one object,
   a plurality of rotation hypotheses for the at least one object, and
   a distance, between the at least one object and an image acquisition module having acquired the image, determined using the diagonal length of the at least one bounding box.

2. The method according to claim 1, further comprising performing a classification of the plurality of rotation hypotheses to obtain an estimated rotation.

3. The method of claim 2, wherein the classification of the plurality of rotation hypotheses comprises a rejection of outliers or a clustering.

4. The method according to claim 2, wherein the estimated rotation is expressed as a quaternion.

5. The method according to claim 2, further comprising performing a principal component analysis on the rotation hypotheses so as to determine whether the estimated rotation exhibits an ambiguity.

6. The method of claim 1, further comprising performing a classification of the plurality of rotation hypotheses to obtain an estimated rotation and using the estimated rotation and the distance, between the at least one object and the image acquisition module, to estimate the 6D pose of the at least one object.

7. The method according to claim 1, comprising a preliminary training of the neural network, the preliminary training comprising inputting a template image in which at least one three-dimensional template object has been rendered to the neural network.

8. The method of claim 7, wherein the preliminary training further comprises:
   obtaining, using the neural network:
   the type of at least one template object visible on the template image,
   the position and shape in the image of at least one two-dimensional bounding box surrounding the at least one template object,
   a plurality of rotation hypotheses for the at least one template object, and minimizing L in the following equation:

$$L(Pos, Neg) = \sum_{b \in Neg} L_{class} + \sum_{b \in Pos} (L_{class} + \alpha L_{fit} + \beta M(f_\theta(I), p))$$

in which:

$$M(f_\theta(I), p) = \left(1 - \epsilon \frac{M}{M-1}\right) \hat{M}(f_\theta(I), p) + \frac{\epsilon}{M-1} \sum_{j=1}^{M} L(f_\theta^{(j)}(I), p)$$

$$\hat{M}(f_\theta(I), p) = \min_{j=1,\ldots,M} L(f_\theta^{(j)}(I), p)$$

and:
I is the template image,
Pos represents the bounding boxes which have an area which encloses a predefined fraction of area of the template object,
Neg represents the bounding boxes which have an area which does not enclose a predefined fraction of area of the template object,
b is a bounding box belonging to either Pos or Neg,
$L_{class}$ is the loss associated with errors in the attribution of class,
$L_{fit}$ is the loss associated with errors the location of the corners of bounding boxes,
$L_{view}$ is the loss associated with errors in the attribution of viewpoints,
$L_{inplane}$ is the loss associated with errors in the attribution of in-plane rotations,
$\alpha$, $\beta$ and $\epsilon$ are predetermined coefficients,
M is the number of rotation hypotheses,
I is the template image
p is the true rotation of the at least one object,
$f_\theta^{(j)}(I)$ is the function which delivers the rotation hypothesis j,
$f_\theta(I)$ is the function which delivers the rotation hypotheses $f_\theta^{(j)}(I)$,
$L(f_\theta^{(j)}(I), p)$ is a loss function of $f_\theta(I)$ for a known rotation p.

9. The method of claim 8, wherein during the training, the neural network is updated using a rotation hypothesis $\theta^*$ determined as:

$$\theta^* = \arg\min_\theta \sum_{i=1}^{N} M(f_\theta(I_i), p_i)$$

wherein $p_i$ are N rotations associated with images $I_t$ which have a similar image for the at least one template object.

10. A non-transitory computer readable medium storing a computer program including instructions for executing the steps of the method according to claim 1 when the program is executed by a computer.

11. A recording medium readable by a computer and having recorded thereon a computer program including instructions for executing the steps of a method according to claim 1.

12. A system for processing an image, the system comprising:
   a processor executing a neural network to which an image can be inputted, the processor being configured to:
   obtain a plurality of feature maps, each feature map having a respective resolution and a respective depth, and perform a classification on each feature map to deliver, for each feature map:

the type of at least one object visible on the image, the position and shape in the image of at least one two-dimensional bounding box surrounding the at least one object, a plurality of rotation hypotheses for the at least one object, and a distance, between the object and an image acquisition module having acquired the image, determined using the diagonal length of the at least one bounding box.

\* \* \* \* \*